United States Patent [19]

Pope et al.

[11] Patent Number: 4,797,877

[45] Date of Patent: Jan. 10, 1989

[54] COMMUNICATION SYSTEM DYNAMIC CONFERENCER CIRCUIT

[75] Inventors: Kevin T. Pope, Poway, Calif.; David C. Trimble, Holmdel, N.J.

[73] Assignees: American Telephone and Telegraph Company, New York, N.Y.; AT&T Information Systems Inc., Morristown, N.J.

[21] Appl. No.: 943,242

[22] Filed: Dec. 18, 1986

[51] Int. Cl.⁴ .......................................... H04Q 11/04
[52] U.S. Cl. ...................................... 370/62; 379/204
[58] Field of Search ................... 370/62; 379/202, 204, 379/205, 206

[56] References Cited

U.S. PATENT DOCUMENTS

| | | | |
|---|---|---|---|
| 4,267,593 | 5/1981 | Regan et al. | 370/62 |
| 4,274,155 | 6/1981 | Funderburk et al. | 370/62 |
| 4,276,639 | 6/1981 | Fukuda et al. | 370/62 |
| 4,301,531 | 11/1981 | Lubin | 370/62 |
| 4,382,295 | 5/1983 | Moffitt et al. | 370/62 |
| 4,389,720 | 6/1983 | Baxter et al. | 370/62 |
| 4,466,093 | 8/1984 | Renner | 370/62 |
| 4,472,798 | 9/1984 | Hafer | 370/62 |
| 4,479,211 | 10/1984 | Bass et al. | 370/62 |
| 4,606,021 | 8/1986 | Wurst | 370/62 |

Primary Examiner—Douglas W. Olms
Attorney, Agent, or Firm—John A. Caccuro

[57] ABSTRACT

A communication system includes station ports for connecting station sets to the system. A port circuit includes a number of conference registers which are not dedicated to particular station ports but rather are assigned as needed to port circuits. When a request is made to form an N party conference call, N−2 available ones of the conference registers are then assigned to each port of the port circuit which is involved in the resulting conference call connection.

16 Claims, 4 Drawing Sheets

TS MATCH TABLE 300

| REGISTERS | TX-TSA (301) | RX-TSA (302) |
|---|---|---|
| P1 | TS6 | TS16 |
| P2 | TS16 | TS6 |
| P3 | — | — |
| ⋮ | ⋮ | ⋮ |
| P16 | — | — (303) |
| C1 |  | TS3 |
| C2 |  | TS4 |
| C3 |  | TS5 |
| C4 | ✕ | TS3 |
| C5 |  | TS4 |
| C6 |  | TS5 |
| C7 |  | — |
| ⋮ |  | ⋮ |
| C16 |  | — |

CONFERENCE ASSIGN TABLE 310

| CONFERENCE SLOT | PORT |
|---|---|
| C1 | 1 |
| C2 | 1 |
| C3 | 1 |
| C4 | 2 |
| C5 | 2 |
| C6 | 2 |
| C7 | — |
| ⋮ | ⋮ |
| C16 | — |

RX BUFFER TABLE 320

|  | REGISTER | TS SAMPLE |
|---|---|---|
| 10000 | C1 | TS3 SAMPLE |
| 10001 | C2 | TS4 SAMPLE |
| 10010 | C3 | TS5 SAMPLE |
| 10011 | C4 | TS3 SAMPLE |
| 10100 | C5 | TS4 SAMPLE |
| 10101 | C6 | TS5 SAMPLE |
| ⋮ | ⋮ | ⋮ | (321)
| 11111 | C15 | — |
| 00000 | P1R | TS16 SAMPLE |
| 00001 | P2R | TS6 SAMPLE |
| 00010 | P3R | — |
| ⋮ | ⋮ | ⋮ | (322)
| 01111 | P16R | — |

TX BUFFER TABLE 330

| REGISTER | TS SAMPLE |
|---|---|
| P1T | TS6 SAMPLE |
| P2T | TS16 SAMPLE |
| P3T | — |
| ⋮ | ⋮ |
| P16T | — |

COMMUNICATION SYSTEM DYNAMIC CONFERENCER CIRCUIT

TECHNICAL FIELD

This invention relates to digital conferencing arrangements and more particularly to a digital conferencing arrangement having a common pool of circuitry which can be dynamically allocated to one or more conference connections.

BACKGROUND OF THE INVENTION

Distributed digital conference systems enable individual system ports to operate under processor control to create a conference connection by combining selected time slot digital port signals. In such systems, to assure that the number of conference registers required for a conference connection was sufficient, a large fixed number of conference registers were dedicated to each station port. Consequently, when a conference connection involved less than the maximum number of conferees, there were many idle conference registers. With the continuing increase in complexity of communication circuits, it has become commonplace for a circuit board to contain port circuitry for interfacing two or more port devices. As a result, the average number of idle conference registers on a port circuit board basis is increased. What is desired is a way to more efficiently utilize conference registers to provide a more cost-effective conference connection capability in a distributed digital system.

SUMMARY OF THE INVENTION

In accordance with one illustrative embodiment of the present invention, a digital communication system includes a port circuit board having a plurality of ports, each interfacing a port device to the system. The port circuit board also includes a plurality of conference registers which are not associated with particular ports but rather are pooled as a common resource. Each conference register is assigned as needed to a port in response to a request from that port to conference or add another port to a connection between two or more other ports. Thus, for example, according to the present invention a port circuit board which interfaces N ports (where N is an integer number) may include a pooled group of X registers (where X is an integer number) which can be dynamically assigned to establish an X+2 party conference connection, or individually assigned in some distribution to more than one conference connection. Since the number of registers (X) provided on each port circuit board would typically be much less than the maximum number of connections expected per conference multiplied by the number of ports (N) serviced by the port board, there is the potential for conference blocking. Consequently, the system is designed to limit the number of ports in a conference connection in order to maintain acceptable blocking characteristics.

BRIEF DESCRIPTION OF THE DRAWING

The operation and utilization of the present invention will be more fully apparent from the detailed description taken in conjunction with the drawing in which.

SYSTEM DESCRIPTION

While the disclosed embodiment is described for use in a telephone system, it more generally can be used in any digital arrangement for combining a plurality of digital inputs in dynamically defined combinations and distributing the resulting digital signal to any of a plurality of outputs. Such application may include use in a digital paging system, a radio system, a multi-input digitized audio recording system, a digital synthesizer, etc.

In the following description, each element of each figure has a reference designation associated therewith, the first number of which refers to the figure in which that element is located (e.g., 101 is located in FIG. 1).

Figure 1:
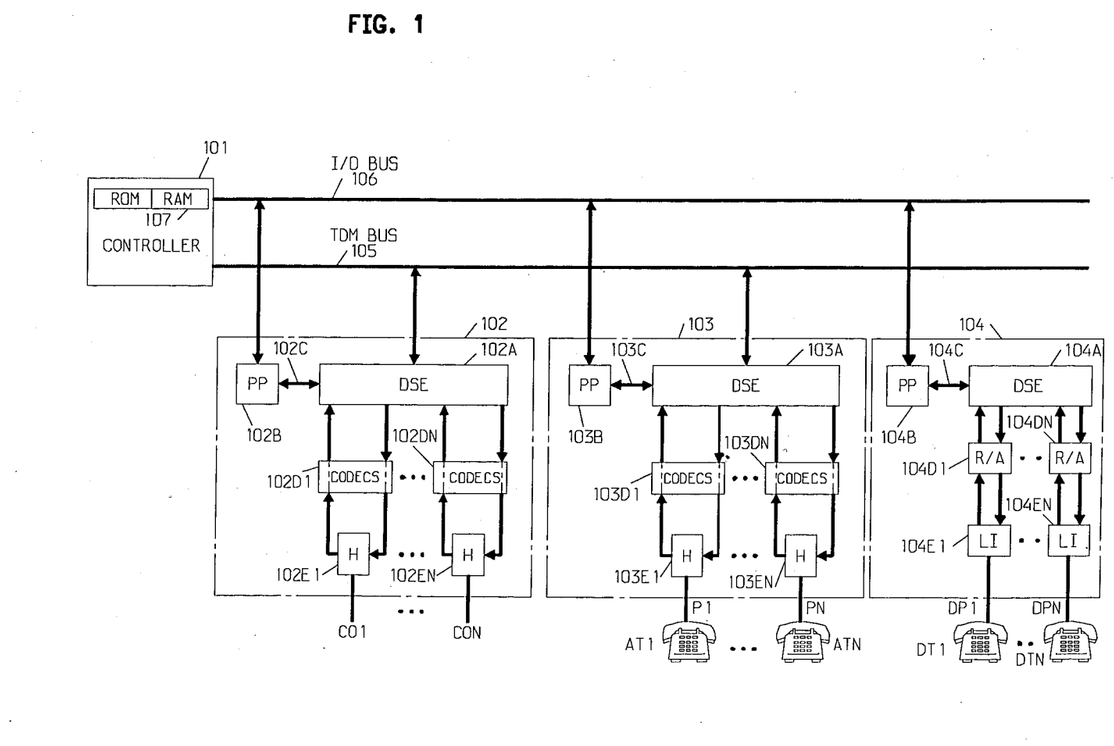
FIG. 1 is a block diagram of a communication system useful in describing the operation of the present invention.

Shown in FIG. 1 is an illustrative block diagram of a digital communication system useful in describing the operation of the present invention. The system includes, illustratively, a processor-based controller 101 which interconnects a port boards 102, 103, and 104 via a time-division multiplexed (TDM) bus 105 and an input/output (I/O) bus 106. Controller 101 establishes and controls communciations over TDM bus 105 and I/O bus 106. Program memory 107 may include random-access-memory (RAM) and read-only-memory (ROM) to provide stored program instructions to controller 101 for controlling the operation of various communication features and functions of the system. Controller 101 includes a standard arrangement of a microprocessor; a real time clock; periodic interrupt circuitry; port board and other interface circuitry; clock and tone circuitry; and associated power-up/power-down, reset and sanity timer circuits.

In the disclosed embodiment, the I/O bus 106 includes a 16-bit address bus, an 8-bit data bus, multiple port board control signals, a reset signal, a clock signal, a frame reset signal, and a port board interrupt signal. The I/O bus communicates control signals to control the information flow between controller 101 and port boards 102, 103 and 104.

The TMD bus 105, for example, may operate at a frame rate of 8 KHz and includes 256 time slots, each 8 bits wide. The TMD bus 105 carries the communication information (i.e., data, digitally encoded voice and tone signals, and associated control signals) over assigned time slots between controller 101 and port boards 102, 103 and 104.

Port boards 102-104 each include a digital switch element (DSE) 102A-104A, respectively. Obviously, the number of port boards can be increased depending on the particular system implementation. These DSEs provide a distributed switching matrix for the system. Each DSE connects to I/O bus 106 directly and also connects to TMD bus 105 directly. Port processors 102B-104B connect via I/O bus 106 to controller 101. Controller 101 controls the function of each port board 102-104 via the port processors 102B-104B. In an alternative embodiment, the function performed by port processors 102B-104B can be incorporated into controller 101.

Illustratively, port board 102 utilizes one DSE 102A and one port processor 102B to interface multiple analog central office (CO) lines CO1-CON via separate hybrids 102E1-102EN and codecs 102D1-102DN. Similiarly, port board 103 interfaces multiple analog telephones AT1-ATN, via ports P1-PN, separate hybrids 103E1-103EN and codecs 103D1-103DN. Illustratively, port board 104 utilizes one DSE 104A and one port processor 104B to interface multiple digital telephones DT1-DTN via ports DP1-DPN, separate line interfaces (LI) 104E1-104EN and rate and adaption (R/A) circuits 104D1-104DN. For purposes of the present description, it is assumed that N is equal to 16.

Before proceeding with the detailed operating description of the present invention, it should be recognized that the present invention may be utilized in other telephone communication systems. Since such systems utilize a variety of hardware and programming techniques, no attempt is made to describe the hardware and programs used to control the communication system. However, the present invention must be incorporated into the overall structure of the system in which it is used and must be tailored to mesh with other features and operations of the system. Thus, in order to avoid confusion and in order to enable those skilled in the art to practice the claimed invention, this specification will describe the operation of the present invention using the system block diagram of FIG. 1, the circuit block diagram of FIG. 2, the tables of FIG. 3 and the timing signals of FIG. 4.

DETAILED DESCRIPTION

Figure 2:
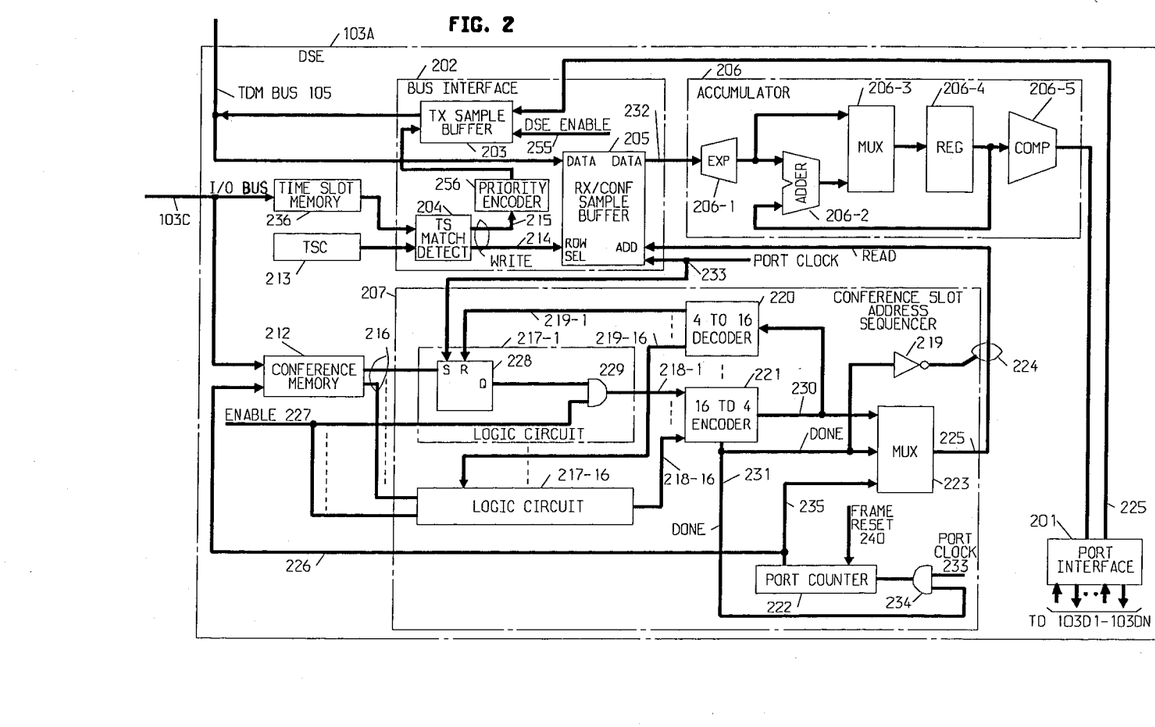
FIG. 2 is a block diagram of a digital switch element including an embodiment of a dynamic conferencing circuit utilized in the present invention.

Shown in FIG. 2 is a block diagram of a DSE including the present dynamic conferencing circuit. Illustratively, the operation of DSE 103A is described, the operation of DSE 102A and DSE 104A being identical to that of DSE 103A. DSE 103A functions as a digital switch for voice and data, and as a "$\mu$"- or "A"- law pulse code modulation (PCM) voice conferencer. It should be recognized that such digital companding could be linear or utilize other encoding algorithms and so is not a requirement to implement the present invention. Each DSE 102A, 103A and 104A contains a portion of the switch matrix of the system. These DSEs communicate digital signal (e.g., 8-bit voice samples) and control data between each other and controller 101 via the 8-bit TDM bus 105. As previously noted, the DSEs interface multiple port devices—e.g., codecs (such as 102D1) or digital transceivers (e.g., digital microphones and receivers such as DT1)—to the TDM bus 105. The DSE places port device samples onto and removes port device samples from TDM bus 105 during specific time slots under control of controller 101. Thus, two time slots per call are needed, one time slot for transmitting and one for receiving.

With continued reference to FIG. 2, port interface 201 interfaces to DSE 103A a total of N devices 103D1 to 103DN which may include codecs (e.g., 103D) and-/or digital transceivers (e.g., digital telephone DT1). Port interface 201 utilizes a standard transmission format for digitial serialized voice and control data transmission and reception from the codecs and/or digital transceivers.

On the system side, bus interface 202 interfaces DSE 103A to TDM bus 105. Bus interface 202 includes transmit sample buffer 203, receive sample buffer 205 and time slot match detector 204. Receive sample buffer 205, as will be discussed later, also includes a conference buffer for storing conference voice samples. Time slot (TS) detector 204, in response to commands received over processor bus 103C and stored in time slot memory 236, accesses specific time slots out of the 256 time slots on TDM bus 105. With reference to TS Table 300 of FIG. 3, time slots are associated with each of the transmit (TX) channels 301 and receive (RX) channels 302 for the N ports (illustratively, N=16) connected to DSE 103A via port interface 201 and are associated with each of the conference registers 303 of DSE 103A as needed. The commands received over processor bus 103C originate from controller 101. Returning to FIG. 2, transmit buffer 203 stores the 16 port samples to be transmitted. Receive buffer 205 stores the 16 received port sample signals in addition to the 16 received conference slot signals from TDM bus 105.

Figure 3:
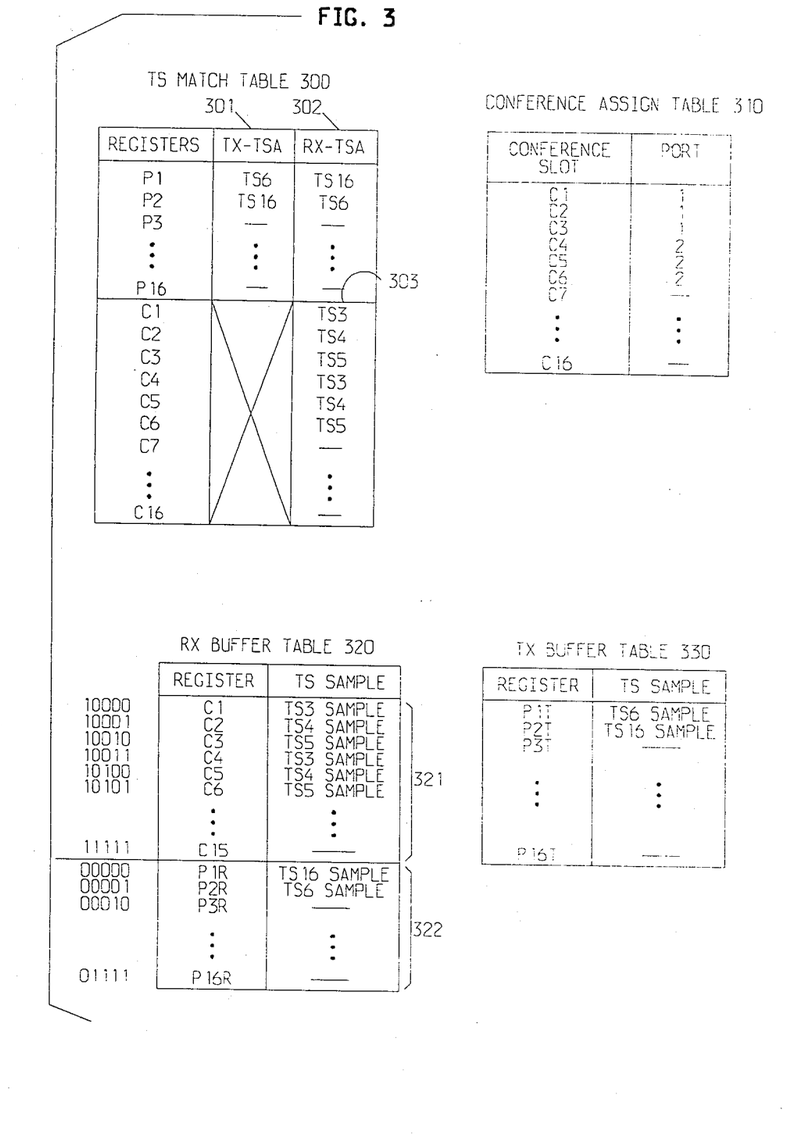
FIG. 3 shows tables which illustrate the contents of various registers and buffers utilized by the present invention.

Conference slot address sequencer 207 selects the conference signal samples associated with each port from receive buffer 205 using conference slot allocation memory 212. Conference slot allocation memory 212, the contents of which are shown in 310 of FIG. 3, illustrates how a port is identified with a conference register. The conference signal samples together with the appropriate received port signals (RX-TSA) are sent to accumulator 206 to generate a combined received conference signal sample.

Accumulator 206 converts the digital samples received from receive buffer 205 to "$\mu$"- or "A"-law samples for output to particular codecs via port interface 201.

Conference slot address sequencer 207, together with TS detector 204, receive buffer 205, accumulator 206, and conference slot allocation memory 212, enables DSE 103A to provide the disclosed dynamic conferencing capability.

In accordance with the present invention, DSE 103A allocates or assigns conference registers to ports dynamically under control of controller 101. The conference register to port assignments are stored in conference memory 212. Illustratively, as previously assumed, DSE 103A has a total of 16 conference registers and services 16 station ports (i.e., N=16). Thus, the 16 conference registers can be assigned to any one or assigned among all of the 16 station ports (i.e., P1 through P16) in any combination. To conference a party to an existing connection, a conference register or slot is assigned to store that party's received signal sample. Thus, generally, for an "M" party conference, "M-2" conference registers or slots must be assigned to each participating station port of DSE 103A. In this fashion, multi-party conferences are supported via a shared conference registor pool. A typical 5-party conference call (M=5) will be described in a later paragraph.

DSE 103A is programmed by controller 101 via processor bus 103C. Time slot memory 236 is programmed with the transmit and receive time slot assignments for each of the 16 ports serviced by DSE 103A. Additionally, time slot memory 236 is programmed with the time slot assignments for the 16 conference registers associated therewith. Thus, with reference to FIG. 3, TS Match Table 300, which represents the contents of time slot memory 236, shows the assignments of time slots to transmit ports (301), receive ports (302) and conference registers (303). For example, the transmit channel for port P1 is time slot 6 (TS 6) and the receive channel of port P1 is TS 16. Assume a user on port P1 was in conversation with a party on port P2. Then for port P2, the transmit channel is TS 16 and the receive channel is TS 6. Thus, the transmit channel of port P1 must have the same time slot, i.e., TS 6, as the receive channel of port P2 and vice versa.

Assume further that the 2-party call between users at port P1 and port P2 has been extended to a 5-party conference call by adding three more parties. Controller 101 assigns three conference registers to each station port (P1 and P2) of DSE 103A which participates in the conference call. Hence, conference registers C1, C2 and C3 are assigned to port P1 and conference registers C4, C5 and C6 are assigned to port P2 as shown by Table 310 of FIG. 3. Note, the particular assignment of conference registers and time slots are for purposes of illustration only.

With joint reference to FIGS. 2 and 3, conference slot allocation memory 212 is also programmed by controller 101 via processor bus 103C. The contents of conference slot allocation memory 212 is shown in Table 310 which shows the assignment of conference registers to ports. In the disclosed embodiment, Table 310 includes 16 registers of words, each 4 bits long. Each conference register corresponds to one of the 16 available conference slots. These conference slots are individually allocatable to ports in any combination. A conference slot is allocated to a port by writing the port number (P0 to P15) into the desired conference register. This 16-word, 4-bit per word conference memory 212 may be implemented as a form of associative memory. This conference memory is used to configure the dynamic conferencer circuit of FIG. 2 for the assignment or allocation of conference registers.

Illustratively, for the 5-party conference call example, as shown in Table 310 registers C1–C3 and C4–C6 are assigned to ports P1 and P2, respectively, indicating that ports P1 and P2 are connected to a 5-party conference call. With reference to 303 of Table 300, registers C1–C6 specify the receive time slots of the conferees added to the original call parties at ports P1 and P2. The time slots TS 5 and TS 16 assigned to the original call parties of the call are stored in the appropriate registers 301 and 302 associated with ports P1 and P2.

In this illustrative 5-party conference call, the party at port P1 would receive the 8-bit voice sample TS 16 arithmetically summed by accumulator 206 with the voice samples associated with the time slots (TS 3, TS 4 and TS 5) specified by registers C1–C3. This summed 4-party voice signal is outputted via port interface 201 to the facility connected to port P1. Similarly, the party at port P2 receives the summed sample from TS 3, TS 4, TS 5 and TS 6. The remaining conferees would, in this particular embodiment, receive their summed samples via either port circuit board 102 if the party is a CO line party or via circuit board 104 if the party is on a digital station set. Whether the remaining conferees were connected via port board 102 or port board 104, the operation would be analogous to that described for the parties on port board 103.

More particularly, in the illustrative 5-party conference call being discussed, the first step is to load the 32-word, 8-bits per word receive buffer 205 with samples from TDM bus 105. Table 320 illustrates the content of receive buffer 205. As previously discussed, DSE 103A is programmed by writing the desired time slot addresses into the 48-word, 8-bit time slot memory 236. Whenever the time slot number of time slot counter 213 matches the contents of one or more of the port locations of time slot memory 236, one or more enable signals are generated by time slot match detect circuit 204 and outputted over enable signal busses 214 or 215. When the TS match is for a receive port, the enable signal 214 causes the current TDM bus 105 sample to be loaded into receive buffer 205 in the location corresponding to the port which had the time slot match. When the TS match is for a transmit port, a DSE enable signal 255 causes a sample from transmit buffer 203 to be loaded onto TDM bus 105. In this manner, a new set of TDM bus 105 samples gets placed into receive buffer 205 every frame. Independent of time slot memory 236, every frame a new set of transmit samples is loaded into transmit buffer 203 from port interface 201 via bus 225.

The 32-word, 8-bit receive buffer 205 may be implemented as a dual-port RAM, one port of which is input-only and the other port outputonly. TDM bus 105 samples come in through the input port and are placed into the locations specified by row select signals on RX write bus 214. Each of the 32 row select inputs of receive buffer 205 is driven directly by one of the 32 row select signals of RX write bus 214 from TS match detector 204, eliminating the need for any row decode circuitry in receive buffer 205 on the input-only port. Receive buffer 205, as illustrated by 322 and 321 of Table 320, includes, respectively, 16 receive registers and 16 conference registers. Since different receive registers or conference registers may be storing the same time slot sample (e.g., C1 and C4 of Table 300), one or more of the row select inputs can be active at any time.

Similarly, the 16-word, 8-bit transmit buffer 203, contents illustrated by Table 330, may be implemented as a dual-port RAM, one port of which is an input-only and the other an output-only port. Samples received over bus 225 from port interface 201 are loaded into transmit buffer 203 via the input ports. The 16 row select signals of bus 215 are sent to a priority encoder 256 to form a 4-bit address for the transmit buffer 203 output port. The sample associated with the particular address is loaded from the transmit buffer 203 to the TDM bus 105.

Time slot counter 213 is an 8-bit counter which continually counts the time slots (0 to 255) on TDM bus 105. At any instant, the value of the time slot counter 213 indicates which time slot is currently active on TDM bus 105.

Time slot memory 236 may be implemented as a 48-word, 8-bit associative memory. Each of the 48-word, 8-bit locations is both readable and writable via processor bus 103C. The 8-bit values represent time slot addresses that refer to one of the 256 time slots on the TDM bus. For each of the 48 words or registers of time slot memory 236, there is an 8-bit comparator in TS match detector 204 which signals a match between the time slot counter 213 and the contents of a register of time slot memory 236. Each comparator outputs a row select signal when a match is detected. The transmit buffer 203 receives a 4-bit address which is formed by encoder 256 encoding the 16 transmit match detect signals from TX bus 215 and receive buffer 205 receives 32 row select signals on RX bus 214. The match signals indicate when that specified time slot is active and the sample associated with that time slot is to be taken from or inserted on TDM bus 105.

Table 320 illustrates the contents of receive buffer 205 for the 5-party conference call example being discussed. The samples contained in the bottom 16 locations of receive buffer 205 are sent out in sequence every frame to each of the 16 ports via port interface 201. The top 16 locations are dynamically allocated to ports by the dynamic conferencer circuit using Table 310. For each port, the associated conference samples are extracted from the top 16 locations of receive buffer 205 in the proper order by the conference slot sequencer 207 and then fed into accumulator 206 along with the receive sample for that port located in the bottom part of receive buffer 205.

Figure 4:
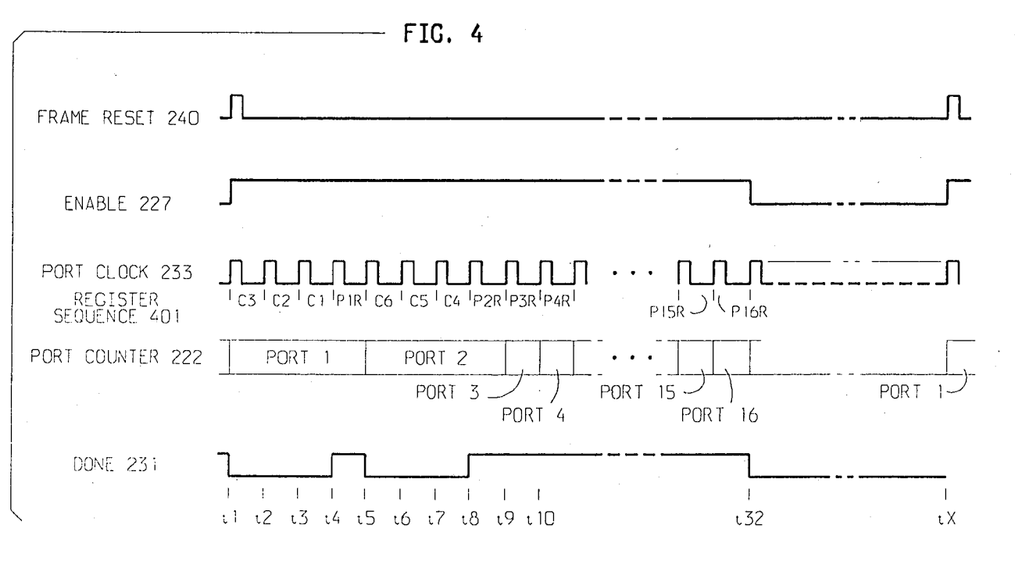
FIG. 4 illustrates a representative timing diagram useful in describing the operation of the present invention.

With reference to FIGS. 2, 3 and 4, the operation of conference slot address sequencer 207 is described. Conference slot address sequencer 207 has the function of selecting and accessing the TS samples in receive buffer 205 which are to be combined to form the conference signal for each port connected to DSE 103A. Briefly, with reference to TS Table 300 for the 5-party conference call example, the user at port P1 receives the voice signal sample TS 16 transmitted from the user at port P2. Additionally, the user at port P1 receives the other three conferee voice signal samples TS 3, TS 4 and TS 5 from, respectively, conference registers C1, C2 and C3. Accumulator 206 combines the voice sample signals (TS 16, TS 3, TS 4 and TS 5) and outputs the resultant combined signal to port P1 via interface 201. Of course, the user at port P1 also receives a side tone component of his/her own voice at the station set. Similarly, the user at port P2, who is also connected to DSE 103A, receives the voice signal sample TS 6 from port P1 in addition to voice signal samples TS 3, TS 4 and TS 5 from, respectively, conference registers C4, C5 and C6.

Whether handling 2-party or conference calls, DSE 103A services each of its 16 ports in sequence once every frame. The port number of the port currently being serviced is contained in port counter 222. Port counter 222 is cleared by Frame Reset signal 240 once every frame. Port counter 222 is a 4-bit counter which generates port addresses (P1 to P16) which are used to access conference memory 212. Port counter 222 counts when enabled by Done signal 231 which is generated by 16 lead to 4-bit address encoder 221. When port counter 222 is cleared, all four bits of the counter are zero, representing port address P1. This is shown at time t1 of FIG. 4. The four bits output from port counter 222 are sent to conference memory 212. As shown by Conference Assign Table 310, conference slots C1–C3 are assigned to port P1. Conference memory 212 is a content addressable memory. Thus, when port address P1 is inputted into conference memory 212, conference registers C1, C2 and C3 are all accessed, causing their associated output leads in bus 216 to go active. Logic circuit 217-1 is representative of the 16 logic circuits (217-1 through 217-16) which interconnect bus 216 with 4-bit encoder 221. Logic circuit 217 is enabled by Enable signal 227 only during the time when a conference mode exists. During the present illustrative 5-party conference call, Enable signal 227 is at logic 1 as shown in FIG. 4.

Since the first three conference registers C1,C2 and C3 are assigned to port P1, their output leads set the set/reset (S/R) flip-flop 228 of the first three 1 ,circuits of the group 217-1 through 217-16. The Q output of S/R flip-flop 228 of each 1 ,circuit is gated via gate 229 to encoder 221. Consequently, the first three inputs 218-1, 218-2 (not shown) and 218-3 (not shown) of encoder 221 are active. The possible outputs of encoder 221 vary from 0000 for the lowest or first input (218-1) to 1111 for the highest or last input (218-16). Since three 1 ,circuits 217-1, 217-2 (not shown), and 217-3 (not shown) are active (because these three conference registers are assigned to port P1), the highest input lead (218-3, not shown) is encoded by encoder 221. Thus, for our example, conference register C3 causes encoder 221 to generate the conference register address 0010. After the voice sample from conference register C3 is sent to accumulator 206, the voice sample from conference register C2 and then conference register C1 will be sent to accumulator 206.

The 4-bit conference register address output 230 generated by encoder 221 and the 4-bit output 231 of port counter 222 are inputs to two-channel multiplexer 223. Multiplexer 223 selects input 230 when Done signal (lead 231) is at logic 0 and selects input 231 when Done signal is at logic 1. The Done signal is generated by encoder 221.

Conference slot address sequencer 207 forms a 5-bit buffer address bus 224 that is used to extract voice samples from receive buffer 205 in the proper order. The samples are fed to accumulator circuit 206 which combines the samples into one voice signal. The 5-bit address bus 204 uses the inverted Done signal 231 as the most significant bit and the output 225 of multiplexer 223 as the lower four bits.

With reference to FIG. 4, the Done signal 231 is generated by encoder 221 when no more of its input leads (218-1 to 218-16) are active or logic 1. This indicates that no conference register remains to be serviced for the current port number. Thus, Done signal 231 is at logic 0 while the voice samples of conference registers C3, C2 and C1 are being processed. The Done signal 231 is used to enable port counter 222 and to switch multiplexer 223.

During time t1, the address 0010 from encoder 221—representing conference register C3—together with the inverted Done signal logic 1 from inverter 219 forms the address 10010 on buffer address bus 224. As shown by Table 320 of FIG. 3, location 10010 of receive buffer 205 stores the sample TS 5 for conference register C3. The sample TS 5 is outputted over bus 232 to accumulator 206. Accumulator 206 stores the voice sample for later combination with other voice samples from conference registers C1 and C2 and receive register of port P2.

The time periods, t1-tx, change on every port clock signal 233. Port clock signal 233 is used to clock the address bus 224 into receive sample buffer 205 and to clock S/R flip-flop 228. The output of encoder 221 represents the address of the conference register being accessed by conference slot address sequencer 207. Decoder 220 decodes conference register C3 address 0010 on bus 230 during the port clock signal at time t2, causing output lead 219-3 (not shown) to go to logic 1. This lead clears the S/R flip-flop 217-3 associated with conference register C3. As a result, the output lead from S/R flip-flop 217-3 goes to logic 0. As a result, encoder 221 selects the next highest active conference register output lead 218-2 (not shown), which in our example is associated with conference register C2. The conference register address generated by encoder 221 changes from 0010 to 0001 to indicate the address of conference register C2. This conference register C2 address is combined with the logic 1 of the inverted Done lead 231 to form the address 10001 on address bus 224. Note Done lead 231 remains at 1 ,0 since conference register S/R flip-flop 217-1 is still at logic 1. Thus, the operation of decoder 220 and encoder 221 cause conference slot address sequencer 207 to sequentially select and access each conference register assigned to a port being serviced.

In a manner as previously described, receive sample buffer 205 is accessed to retrieve the voice sample TS 4 for conference register C2 (see Table 320). Again, this conference register sample is outputted to accumulator 206 which combines it with the previously received sample TS 5 from conference register C3.

At time t3, the next port clock signal causes decoder 220 to clear S/R flip-flop 217-2. Encoder 221 then encodes the last conference register C1 and outputs its address on bus 230. Again, Done signal 231 remains at logic 0. Address bus 224 contains address 10000, thereby accessing register C1 voice sample TS 3 from receive sample buffer 205 as shown in Table 320. Accumulator 206 combines register C1 voice sample TS 3 with voice samples TS 5 and TS 4, respectively, from registers C3 and C2.

At time t4, the next port clock signal 233 causes decoder 220 to clear S/R flip-flop 217-1. Since there are no other S/R flip-flops set, encoder 221 outputs a Done signal 231 at logic 1 The Done signal 231 at logic 1 causes multiplexer 223 to switch to accept the port count output 235 from port counter 222. The address 00000 on address bus 224 represents inverted Done signal at logic 0 and port P1 address 0000 of bus 245. As shown by Table 320, the address 10000 accesses the receive voice sample TS 16 for receive port P1 (P1R). Accumulator 206 combines sample TS 16 with the previously received samples TS 3, TS 4 and TS 5. This sum is outputted via port interface 201 to the user at port P1.

At time t5, the next port clock signal 233 together with a Done signal at logic 1 causes gate 234 to clock port counter 222 to the next count. The next count, 0001, represents port P2. The output of port counter 222 is sent via bus 226 to conference memory 212. As shown by Table 310, port P2 has conference registers C4, C5 and C6 assigned thereto. The outputs of conference memory 212 associated with C6, C5 and C4 are logic 1, causing the respective S/R flip-flops 217-6, 217-5 and 217-4 (not shown) to set. Again, the highest number S/R flip-flop 217-6 (conference register C6) is binarily encoded (0101) by encoder 221 and outputted on bus 230. Since one or more inputs to encoder 221 are at logic 1, Done signal lead 231 goes to logic 0 causing multiplexer 223 to accept inputs on bus 230 from encoder 221.

In a sequence essentially the same as described for port P1, conference slot address sequencer 207 obtains the time slot samples TS 5, TS 4, TS 3 and TS 6 associated, respectively, with conference registers C6, C5 and C4 and receive port P2 register (P2R of Table 320) from receive sample buffer 205. This register sequence is shown by 401 during the time period t5–t9. Accumulator 206 combines the samples into one voice signal which is outputted via port interface 201 to the user at port P2.

At time t9, the next port clock signal 233 causes gate 234 to clock port counter 222 to the next count representing port P3. As shown by Table 310, since there are no conference registers assigned to port P3, no S/R flip-flops 217-1 through 217-16 are set, and hence Done signal 231 remains at logic 1. Thus, at time t9 conference slot address sequencer 207 only accesses receive port P3 register (P3R of Table 320) of receive sample buffer 205. Since register P3R has no sample, as shown in Table 320, obviously port P3 is not involved in any call. Hence no voice sample is outputted to accumulator 206.

Since there are not other active calls involving ports P3 to P16, there are no active time slots assigned in Table 300 to ports P3 to P16 and no samples shown in Tables 320 to 330. Conference slot address sequencer 207 continues to cycle through ports P4 to P16 as described above. At time t32, after completing the servicing of all 16 ports, the Enable lead is reset and prevents additional port clock signals. At time tx, another frame reset signal 401 causes Enable signal to become logic 1, thereby enabling conference slot address sequencer 207 to generate the samples required by ports P1 to P16 during the new frame.

As previously noted, accumulator 206 is used to arithmetically sum the samples as they are retrieved from the receive sample buffer 205 and to send the sum to the port interface 201 for output to the appropriate station port. Since the samples for a given port are supplied sequentially, the sum can be formed using an accumulator.

Voice samples coming from the receive sample buffer 205 are in 8-bit "$\mu$"-or "A"-law encoded form. A front-end expander circuit 206-1 converts the samples into a 14-bit linear form. The linear values are summed with the contents of the accumulator register 206-4 using a 16-bit adder 206-2.

In the formation of a conference sum, the first port sample is loaded directly via multiplexer 206-3 into the accumulator register 206-4. Subsequent samples associated with that port are fed through the adder 206-2. After each sample, the adder's output is loaded into the accumulator register 206-4. Thus, after all samples associated with a given port have been retrieved, the accumulator register 206-4 contains the sum of all previous samples. The 16-bit linear sum is converted by compressor 206-5 to 8-bit "$\mu$" or "A" compressed form and shifted out of the DSE port via port interface 201.

While the present embodiment describes a request for a conference connection as having originated from system ports, it likewise could be initiated by the system attendant, system controller or from an external source (such as a computer) without deviating from the teachings of the present invention. Additionally, while the application of the present invention has been described for use with digitized voice signals, its operation using digitized video, graphic signal or other data signal is contemplated as within the scope of the present invention. Moreover, while the embodiment of the present invention is described as using particular hardware (i.e., controllers, etc.), bus sizes and data rates, it should be recognized that equivalents could be utilized without affecting the teaching of the present invention.

What has been escribed is merely illustrative of one embodiment of the principles of the present invention. Other methods, sequences or circuits can be used by those skilled in the art to implement the present invention without departing from the spirit and scope of the present invention.

What is claimed is:

1. A port circuit including a plurality of ports, each port interfacing a digital device to a digital communication system, said port circuit comprising a plurality of conference registers for storing digital port signals, wherein each of said conference registers is assignable to any of said plurality of ports; and assigning means responsive to a signal requesting an N party conference connection (N is an integer >2) for assigning no more than N-2 available ones of said conference registers to each port of said port circuit connected to said N party conference connection.

2. The port circuit of claim 1 further comprising a receive sample buffer including a plurality of receive registers for storing digital port signals received by said port circuit and wherein said receive sample buffer includes said conference registers.

3. The port circuit of claim 1 wherein said conference registers include a dual-port memory.

4. The port circuit of claim 1 wherein said assigning means includes
means for identifying a port assignment for each of said conference registers.

5. The port circuit of claim 1 further comprising
a time slot counter for counting each digital port signal time slot at said port circuit;
a receive sample buffer including a plurality of receive registers, each of said receive registers arranged to store a digital port signal received during an existing connection of one of said plurality of ports; and
a time slot match detector including
means for associating time slots with said plurality of receive registers and said plurality of conference registers, and
means responsive to said time slot counter and said associating means for enabling one or more of said receive registers and said conference registers to store a digital port signal associated with the count of said time slot counter.

6. The port circuit of claim 5 further comprising
a transmit sample buffer including a plurality of transmit registers, each of said transmit registers arranged to store a digital port signal transmitted from one of said plurality of ports;
wherein said associating means of said time slot match detector associates time slots with said plurality of transmit registers; and
wherein said enabling means of said time slot match detector enables an output from one of said plurality of transmit registers of a digital port signal associated with the count of said time slot counter.

7. The port circuit of claim 1 further comprising
a receive register assigned to said requesting port for storing a digital port signal received thereat,
conference slot sequencer means for accessing digital port signals stored in said conference registers and said receive register assigned to said requesting port, and
accumulating means responsive to said sequencer means for summing said accessed digital port signals.

8. The port circuit of claim 7 wherein said sequencer means includes
means for generating an address for each conference register and
means utilizing said address for sequentially selecting for access each conference register assigned to a port involved in a connection.

9. The port circuit of claim 8 wherein said sequencer means further includes
means for generating a done signal when said sequential selecting means has completed selection of conference registers assigned to said port involved in said connection, and
port counting means for determining a port being serviced by said sequencer means, said port counting means including
means for clearing said port counting means using a framing signal, and
means for clocking said port counting means using said done signal.

10. The port circuit of claim 9 wherein said sequencer means further includes
means responsive to the absence of said done signal for switching said conference register address from said assigning means to access a conference register and responsive to the presence of said done signal for switching a port count address from said port counting means to access a receive register.

11. The port circuit of claim 9 further comprising
a receive sample buffer including a plurality of receive registers for storing digital port signals received by said port circuit and wherein said receive sample buffer includes a plurality of conference registers and wherein
said sequencer means accesses said receive sample buffer using said done signal as the most significant bit of said address and uses said port count address to address said plurality of receive registers when said done signal is at a first 1 ,state and to address said plurality of conference registers when said done signal is at a second 1 ,state.

12. The port circuit of claim 8 wherein said sequentially selecting means uses a port clock signal different from a clock used by said time slot counter.

13. The port circuit of claim 1 wherein said assigning means is responsive to said requesting signal received from one of said plurality of ports.

14. The port circuit of claim 13 wherein said assigning means is responsive to said requesting signal received from a port of said plurality of ports which is not a party to said existing connection.

15. The port circuit of claim 13 wherein said assigning means is responsive to said requesting signal received from a port of said plurality of ports which is a party to said existing connection.

16. A port circuit including a plurality of ports, each port interfacing a station set to a digital communication system, said port circuit comprising
a plurality of conference registers for storing voice samples, wherein each of said conference registers is assignable to any of said plurality of ports; and
assigning means responsive to a request from one of said plurality of ports to establish an N party conference connection for assigning no more than N-2 available ones of said conference registers to each port of said port circuit connected to said N party conference connection.

* * * * *